(12) United States Patent
Deng

(10) Patent No.: US 11,991,762 B2
(45) Date of Patent: May 21, 2024

(54) DIRECT CONNECTION COMMUNICATION METHOD, AMF, ACCESS NETWORK FUNCTIONAL ENTITY AND TERMINAL

(71) Applicant: DATANG MOBILE COMMUNICATIONS EQUIPMENT CO., LTD., Beijing (CN)

(72) Inventor: Qiang Deng, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 672 days.

(21) Appl. No.: 17/260,134

(22) PCT Filed: Jun. 5, 2019

(86) PCT No.: PCT/CN2019/090184
§ 371 (c)(1),
(2) Date: Jan. 13, 2021

(87) PCT Pub. No.: WO2020/029671
PCT Pub. Date: Feb. 13, 2020

(65) Prior Publication Data
US 2021/0289572 A1    Sep. 16, 2021

(30) Foreign Application Priority Data

Aug. 10, 2018   (CN) .......................... 201810908258.X

(51) Int. Cl.
*H04W 76/14*   (2018.01)
*H04W 28/24*   (2009.01)

(52) U.S. Cl.
CPC ........... *H04W 76/14* (2018.02); *H04W 28/24* (2013.01)

(58) Field of Classification Search
CPC .............................. H04W 76/14; H04W 28/24
See application file for complete search history.

(56) References Cited

U.S. PATENT DOCUMENTS

2007/0140243 A1* 6/2007 Eastham ............. H04L 12/1859
370/390
2013/0157679 A1* 6/2013 Van Phan ............. H04W 76/14
455/452.2

(Continued)

FOREIGN PATENT DOCUMENTS

CN   104272707 A   1/2015
CN   104283602 A   1/2015

(Continued)

OTHER PUBLICATIONS

International Search Report for International Application No. PCT/CN2019/090184 dated Sep. 2, 2019.

(Continued)

*Primary Examiner* — Fahmida S Chowdhury
(74) *Attorney, Agent, or Firm* — Meunier Carlin & Curfman LLC

(57) ABSTRACT

Disclosed by the present application is a direct connection communication method, an AMF, an access network functional entity and a terminal. The direct connection communication method comprises: a first terminal sending a direct connection communication request message to a second terminal, the request message carrying a direct connection communication quality of service (QoS) parameter; the first terminal receiving a direct connection communication response message which is from the second terminal and which is determined by according to the direct connection communication QoS parameter, the direct connection communication response message being used to indicate that the second terminal accepts or rejects a request of the first terminal; and if the direct connection communication response message indicates that the second terminal accepts the request of the first terminal, the first terminal establishes a direct connection communication connection to the second (Continued)

terminal according to the direct connection communication response message.

18 Claims, 6 Drawing Sheets

(56) References Cited

U.S. PATENT DOCUMENTS

| | | | | |
|---|---|---|---|---|
| 2013/0287012 | A1* | 10/2013 | Pragada | H04W 76/22 |
| | | | | 370/338 |
| 2013/0288668 | A1* | 10/2013 | Pragada | H04M 15/8044 |
| | | | | 455/426.1 |
| 2014/0162633 | A1 | 6/2014 | Hwang et al. | |
| 2017/0374611 | A1* | 12/2017 | Pragada | H04W 76/14 |
| 2019/0335534 | A1* | 10/2019 | Atarius | H04L 65/1016 |
| 2021/0029761 | A1* | 1/2021 | Jung | H04W 72/02 |
| 2021/0068120 | A1* | 3/2021 | Jung | H04W 4/70 |
| 2021/0243837 | A1* | 8/2021 | Jung | H04W 56/001 |

FOREIGN PATENT DOCUMENTS

| | | |
|---|---|---|
| CN | 106341794 A | 1/2017 |
| WO | 2014131556 A1 | 9/2014 |
| WO | 2015119483 A1 | 8/2015 |
| WO | 2015142132 A1 | 9/2015 |
| WO | 2018129543 A1 | 7/2018 |
| WO | WO-2019240544 A1 * 12/2019 ........... H04L 1/1812 |

OTHER PUBLICATIONS

Hisilicon, Huawei, "Solution to Key Issue #4: Network-controlled QoS mechanism for side link communication," SA WG2 Meeting #127bis, S2-185852 (Revision of S2-185344), Newport Beach, CA, USA (May 28-Jun. 1, 2018).

Intel Corporation, "Discussion on D2D Operation within Network Coverage (Mode-1)," 3GPP TSG RAN WG1 Meeting #76bis, R1-141164, Shenzhen, China Mar. 31-Apr. 4 (2014).

* cited by examiner

DIRECT CONNECTION COMMUNICATION METHOD, AMF, ACCESS NETWORK FUNCTIONAL ENTITY AND TERMINAL

CROSS-REFERENCE OF RELATED APPLICATIONS

The present application is a National Stage of International Application No. PCT/CN2019/090184, filed Jun. 5, 2019, which claims the priority to Chinese Patent Application No. 201810908258.X, filed with the Chinese Patent Office on Aug. 10, 2018 and entitled "DIRECT CONNECTION COMMUNICATION METHOD, AMF, ACCESS NETWORK FUNCTIONAL ENTITY AND TERMINAL", both of which are hereby incorporated by reference in their entireties.

FIELD OF INVENTION

The present application relates to the field of communication technology, and in particular to a direct connection communication method, an AMF, an access network functional entity and a terminal.

BACKGROUND

The communication process of direct communication between two User Equipments (UEs) is defined in the 3rd Generation Partnership Project (3GPP). That is, as shown in FIG. 1, two terminal devices, such as UE1 and UE2, can perform the transmission through a direct communication path between them without passing through a network device, such as base station.

The wireless air interface technology (New Radio (NR) for short) of the fifth generation (5 Generation (5G)) mobile communication technology network supports the information exchange between Vehicle to X (V2X for short) to facilitate the traffic management. The current NR system supports the enhanced V2X services, e.g., platooning. The enhanced V2X services not only have higher requirements on transmission delay and transmission reliability, but also have requirements on other performance indicators such as load. The 3GPP Rel-14 defines the implementation method of Quality of Service (QoS), which mainly includes two indicators: PPPP (ProSe Per-Packet Priority) and PPPR (ProSe Per-Packet Reliability), wherein the PPPP characterizes the delay requirement and the PPPR characterizes the reliability requirement, but the QoS implementation method defined by the 3GPP Rel-14 can no longer satisfy the transmission of enhanced V2X services.

It can be seen that the current QoS implementation method cannot meet the QoS requirement of V2X service transmission well.

BRIEF SUMMARY

The embodiments of the present application provides a direct connection communication method, an Access control and Mobility management Function (AMF) an access network functional entity and a terminal, so as to meet the QoS requirement of V2X service transmission well In a first aspect, a direct connection communication method is provided, which includes:
sending, by a first terminal, a direct connection communication request message to a second terminal, wherein the direct connection communication request message carries a QoS parameter of direct connection communication;
receiving, by the first terminal, a direct connection communication response message determined according to the QoS parameter of direct connection communication from the second terminal, wherein the direct connection communication response message is used to indicate that the second terminal accepts or rejects a request from the first terminal; and
establishing, by the first terminal, a direct connection communication connection with the second terminal according to the direct connection communication response message if the direct connection communication response message indicates that the second terminal accepts the request from the first terminal.

In the embodiment of the present application, before the first terminal and the second. terminal establish a direct connection communication connection, they negotiate the QoS parameter of the direct connection communication service to be transmitted, and the direct connection communication connection is performed only when the second terminal can meet the QoS requirement of the direct connection communication service to be transmitted by the first terminal, so as to meet the QoS requirement of the direct connection communication service well.

Optionally, if the direct connection communication response message indicates that the second terminal accepts the request from the first terminal, the direct connection communication response message includes QoS parameters accepted by the second terminal.

In the embodiment of the present application, if the second terminal accepts the request from the first terminal, it can feed back the QoS parameters accepted by the second terminal to the first terminal, thereby facilitating the first terminal to determine the QoS parameter of the direct connection communication service to be transmitted again.

Optionally, before the first terminal sends the direct connection communication request message to the second terminal, the method further includes:
receiving, by the first terminal, a non-access stratum message sent from an AMF entity, wherein the non-access stratum message includes a QoS rule of direct connection communication and/or a QoS parameter of direct connection communication; and
determining, by the first terminal, the QoS parameter of direct connection communication according to the non-access stratum message.

In the embodiment of the present application, the first terminal determines the QoS parameter of the direct connection communication service to be transmitted according to the QoS rule of direct connection communication and/or a QoS parameter of direct connection communication fed back by the AMF, that is, determines the QoS parameter of direct connection communication according to the feedback from the network side, which not only conforms to the capability supported by the network side but also meets its own requirements.

Optionally, before the first terminal receives the non-access stratum message sent from the AMF entity, the method further includes:
sending, by the first terminal, a non-access stratum request message to the AMF entity, wherein the non-access stratum request message includes information that the first terminal requests the QoS parameter of direct connection communication and/or information that the first terminal supports a direct connection communication capability.

In the embodiment of the present application, the first terminal informs the AMF entity of the QoS parameter of direct connection communication to be requested and/or the direct connection communication capability supported by the first terminal, so that the NNW entity recommends the QoS parameter of direct connection communication matching the first terminal.

Optionally, after the first terminal establishes the direct connection communication connection with the second terminal according to the direct connection communication response message, the method further includes:
sending, by the first terminal, a radio resource control request message to an access network function entity, wherein the radio resource control request message is used to request radio resources required by a direct connection communication service, and the radio resource control request message carries the QoS parameter of direct connection communication;
receiving, by the first terminal, a radio resource control response message returned from the access network function entity, wherein the radio resource control response message includes radio resources determined by the access network function entity according to the QoS parameter of direct connection communication; and
performing, by the first terminal, the direct connection communication service by the radio resources carried in the radio resource control response message.

In the embodiment of the present application, the first terminal requests radio resources from the access network function entity, and the access network function entity allocates radio resources to the first terminal according to the QoS requirement of the first terminal, so that the first terminal perform the transmission of the direct connection communication service by the requested radio resources, which can meet the QoS requirement of the direct connection communication service well.

Optionally, determining, by the first terminal, the QoS parameter of direct connection communication according to the non-access stratum message, includes:
determining, by the first terminal, the QoS parameter of direct connection communication according to the QoS rule of direct connection communication carried in the non-access stratum message; and
transferring, by the first terminal, the QoS parameter of direct connection communication from non-access stratum to access stratum.

In the embodiment of the present application, after determining the QoS parameter of direct connection communication at the non-access stratum, the first terminal transfers the QoS parameter of direct connection communication from the non-access stratum to the access stratum, so that the access network function entity authorizes and checks the QoS parameter of direct connection communication.

In a second aspect, a direct connection communication method is provided, which includes:
receiving, by an AMF entity, a non-access stratum request message sent by a first terminal, wherein the non-access stratum request message includes information that the first terminal requests a QoS parameter of direct connection communication and/or information that the first terminal supports a direct connection communication capability; and
sending, by the AMF entity, a non-access stratum message to the first terminal, Wherein the non-access stratum message includes a QoS rule of direct connection communication and/or a QoS parameter of direct connection communication.

In the embodiment of the present application, the AMF entity feeds back the QoS rule of direct connection communication and/or a QoS parameter of direct connection communication to the first terminal according to the non-access stratum request message of the first terminal, so that the first terminal can determine the final QoS parameter of direct connection communication according to its own QoS requirement and the QoS parameters supported by the network side, so as to meet the actual QoS requirement of the first terminal to perform the direct connection communication services well.

Optionally, after the AMF entity sends the non-access stratum message to the first terminal, the method further includes:
sending, by the AMF entity, an application message to an access network function entity, wherein the application message includes the QoS parameter of direct connection communication of the first terminal.

In the embodiment of the present application, the AMF entity feeds back the QoS parameter of direct connection communication of the first terminal to the access network function entity, so that the access network function entity authorizes and checks the QoS parameter of direct connection communication before the first terminal performs the direct connection communication service, and the access network function entity controls the direct connection communication service performed by the first terminal.

Optionally, after the AMF entity receives the non-access stratum request message sent by the first terminal, the method further includes:
sending, by the AMF entity, the information that the first terminal requests the QoS parameter of direct connection communication and/or information that the first terminal supports the direct connection communication capability to a policy control function entity and/or unified data management function entity.

Optionally, before the AMF entity sends the non-access stratum message to the first terminal or sends the application message to the access network function entity, the method further includes:
receiving, by the AMF entity, QoS parameter information of direct connection communication and/or QoS rule information of direct connection communication of the first terminal from the policy control function entity ardor unified data management function entity.

In the embodiment of the present application, a new method is provided, that is, the AMF entity determines the QoS parameter information of direct connection communication and/or the QoS rule information of direct connection communication fed back for the first terminal through the policy control function entity and/or unified data management function entity.

In a third aspect, a direct connection communication method is provided, which includes:
receiving, by an access network function entity, a radio resource control request message sent by a first terminal, wherein the radio resource control request message includes QoS parameter information of direct connection communication; and
sending, by the access network function entity, a radio resource control response message to the first terminal, wherein the radio resource control response message includes radio resource information required by a direct communication service.

Optionally, before the access network function entity receives the radio resource control request message sent by the first terminal, the method further includes:

receiving, by the access network function entity, a QoS parameter of direct connection communication of the first terminal from an AMF entity; and determining, by the access network function entity, radio resources required by the first terminal to perform the direct communication service according to the QoS parameter of direct connection communication of the first terminal.

In the embodiment of the present application, the first terminal requests radio resources from the access network function entity, and the access network function entity allocates radio resources to the first terminal according to the QoS requirement of the first terminal, so that the first terminal perform the transmission of the direct connection communication service by the requested radio resources, which can meet the QoS requirement of the direct connection communication service well.

In a fourth aspect, a terminal is provided, which includes:
a memory configured to store instructions;
a processor configured to read the instructions in the memory to:
  send a direct connection communication request message to a second terminal via a transceiver, wherein the direct connection communication request message carries a QoS parameter of direct connection communication;
  receive a direct connection communication response message determined according to the QoS parameter of direct connection communication from the second terminal via the transceiver, wherein the direct connection communication response message is used to indicate that the second terminal accepts or rejects a request from the first terminal; and
  establishing a direct connection communication connection with the second terminal according to the direct connection communication response message if the direct connection communication response message indicates that the second terminal accepts the request from the first terminal;
wherein the transceiver is configured to receive and send data under control of the processor.

Optionally, if the direct connection communication response message indicates that the second terminal accepts the request from the first terminal, the direct connection communication response message includes QoS parameters accepted by the second terminal.

Optionally, the processor is further configured to:
receive a non-access stratum message sent from an AMF entity via the transceiver, wherein the non-access stratum message includes a QoS rule of direct connection communication and/or a QoS parameter of direct connection communication; and
determine the QoS parameter of direct connection communication according to the non-access stratum message.

Optionally, the processor is further configured to:
send a non-access stratum request message to the AMF entity via the transceiver, wherein the non-access stratum request message includes information that the first terminal requests the QoS parameter of direct connection communication and/or information that the first terminal supports a direct connection communication capability.

Optionally, the processor is further configured to:
send a radio resource control request message to an access network function entity via the transceiver, wherein the radio resource control request message is used to request radio resources required by a direct connection communication service, and the radio resource control request message carries the QoS parameter of direct connection communication;
receive a radio resource control response message returned from the access network function entity via the transceiver, wherein the radio resource control response message includes radio resources determined by the access network function entity according to the QoS parameter of direct connection communication; and
perform the direct connection communication service by the radio resources carried in the radio resource control response message.

Optionally, the processor is further configured to:
determine the QoS parameter of direct connection communication according to the QoS rule of direct connection communication carried in the non-access stratum message; and
transfer the QoS parameter of direct connection communication from non-access stratum to access stratum.

For the technical effects of the terminal provided by the embodiments of the present application, the reference may be made to the technical effects of the implementations of the first aspect described above, which will not be repeated here.

In a fifth aspect, an AMF entity is provided, which includes:
a memory configured to store instructions;
a processor configured to read the instructions in the memory to:
  receive a non-access stratum request message sent by a first terminal via a transceiver, wherein the non-access stratum request message includes information that the first terminal requests a QoS parameter of direct connection communication and/or information that the first terminal supports a direct connection communication capability; and
  send a non-access stratum message to the first terminal via the transceiver, wherein the non-access stratum message includes a QoS rule of direct connection communication and/or a QoS parameter of direct connection communication; wherein the transceiver is configured to receive and send data under control of the processor.

Optionally, the processor is further configured to:
send an application message to an access network function entity via the transceiver, wherein the application message includes the QoS parameter of direct connection communication of the first terminal.

Optionally, the processor is further configured to:
send the information that the first terminal requests the QoS parameter of direct connection communication and/or information that the first terminal supports the direct connection communication capability to a policy control function entity and/or unified data management function entity via the transceiver.

Optionally, the processor is further configured to:
receive QoS parameter information of direct connection communication and/or QoS rule information of direct connection communication of the first terminal from the policy control function entity and/or unified data management function entity via the transceiver.

For the technical effects of the AMF provided by the embodiments of the present application, the reference may be made to the technical effects of the implementations of the second aspect described above, which will not be repeated here.

In a sixth aspect, an access network function entity is provided, which includes:
- a memory configured to store instructions;
- a processor configured to read the instructions in the memory to:
  - receive a radio resource control request message sent by a first terminal via a transceiver, wherein the radio resource control request message includes QoS parameter information of direct connection communication; and
  - send a radio resource control response message to the first terminal via the transceiver, wherein the radio resource control response message includes radio resource information required by a direct communication service;
- wherein the transceiver is configured to receive and send data under control of the processor.

Optionally, the processor is further configured to:
- receive a QoS parameter of direct connection communication of the first terminal from an AMF entity via the transceiver; and
- determine radio resources required by the first terminal to perform the direct communication service according to the QoS parameter of direct connection communication of the first terminal.

For the technical effects of the access network function entity provided by the embodiments of the present application, the reference may be made to the technical effects of the implementations of the third aspect described above, which will not be repeated here.

In a seventh aspect, a terminal is provided, which includes:
- a sending unit configured to send a direct connection communication request message to a second terminal, wherein the direct connection communication request message carries a QoS parameter of direct connection communication;
- a receiving unit configured to receive a direct connection communication response message determined according to the QoS parameter of direct connection communication from the second terminal, wherein the direct connection communication response message is used to indicate that the second terminal accepts or rejects a request from the first terminal; and
- an establishment unit configured to establish a direct connection communication connection with the second terminal according to the direct connection communication response message if the direct connection communication response message indicates that the second terminal accepts the request from the first terminal.

In an eighth aspect, an AMF entity is provided, which includes:
- a receiving unit configured to receive a non-access stratum request message sent by a first terminal, wherein the non-access request message includes information that the first terminal requests a QoS parameter of direct connection communication and/or information that the first terminal supports a direct connection communication capability, and
- a sending unit configured to send a non-access stratum message to the first terminal, wherein the non-access stratum message includes a QoS rule of direct connection communication and/or a QoS parameter of direct connection communication.

In a ninth aspect, an access network function entity is provided, which includes:
- a receiving unit configured to receive a radio resource control request message sent by a first terminal, wherein the radio resource control request message includes QoS parameter information of direct connection communication; and
- a sending unit configured to send a radio resource control response message to the first terminal, wherein the radio resource control response message includes radio resource information required by a direct communication service.

In a tenth aspect, a computer storage medium with a computer program stored thereon is provided, where the computer program is executed by a processor to implement the method as described in any one of the first or second or third aspect.

In the embodiment of the present application, before the first terminal and the second terminal establish a direct connection communication connection, they negotiate the QoS parameter of the direct connection communication service to be transmitted, and the direct connection communication connection is performed only when the second terminal can meet the QoS requirement of the direct connection communication service to be transmitted by the first terminal, so as to meet the QoS requirement of the direct connection communication service well.

DETAILED DESCRIPTION OF THE EMBODIMENTS

In order to make the purposes, technical solutions and advantages of the present application clearer, the technical solutions in the embodiments of the present application will be described clearly and completely below in combination with the accompanying drawings in the embodiments of the present application.

The transmission delay and transmission reliability corresponding to the QoS parameters supported by the 3GPP Rel-14 can no longer satisfy the transmission of enhanced V2X services.

In view of this, an embodiment of the present application provides a direct connection communication method. In this method, before the first terminal and the second terminal establish a direct connection communication connection, they negotiate the QoS parameter of the direct connection communication service to be transmitted, and the direct connection communication connection is performed only when the second terminal can meet the QoS requirement of the direct connection communication service to be transmitted by the first terminal, so as to meet the QoS requirement of the direct connection communication service well.

The technical solutions provided by the embodiments of the present application will be introduced below with reference to the drawings.

Figure 1:
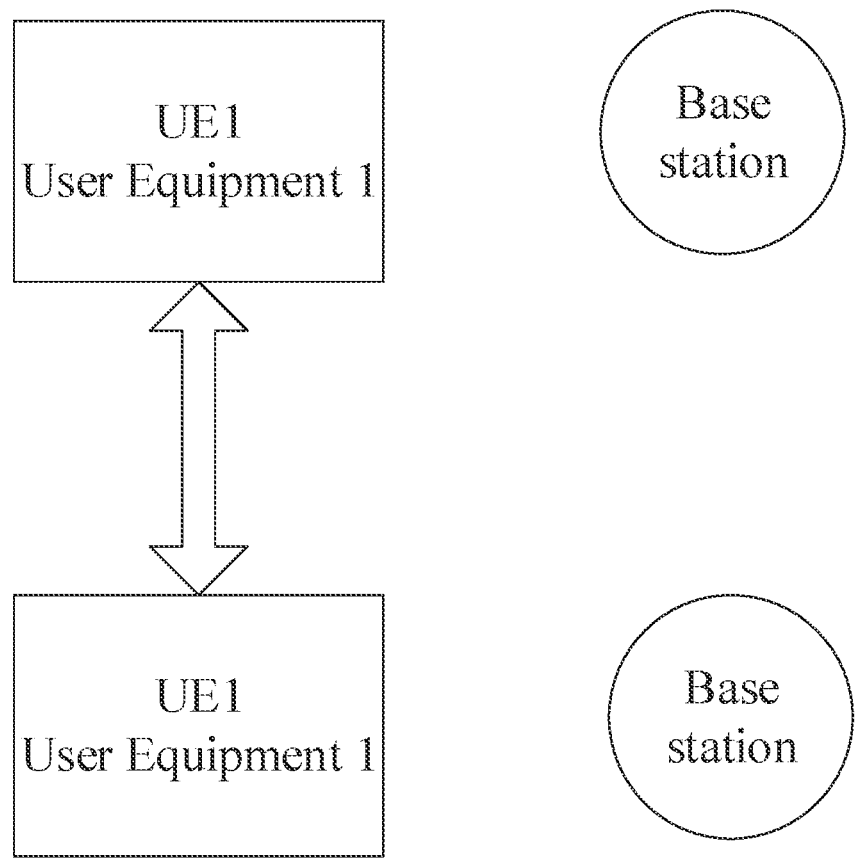
FIG. 1 is a architecture diagram of a direct connection communication system provided by embodiments of the present application.
Figure 2:
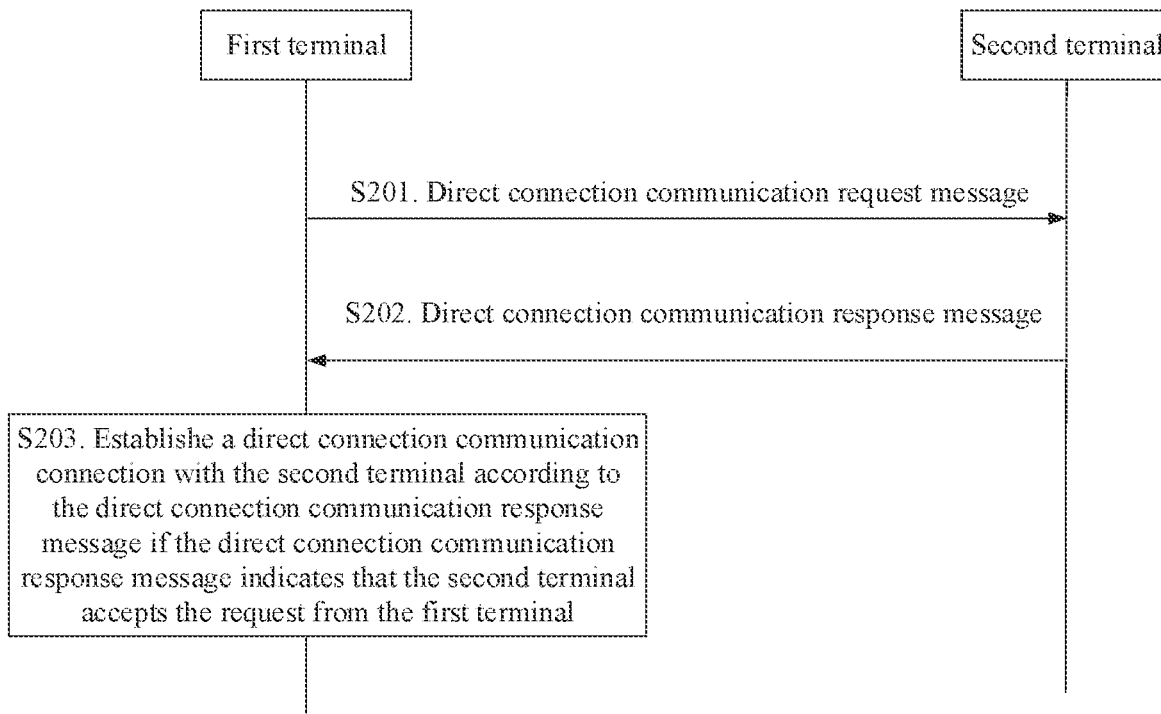
FIG. 2 is a schematic diagram of a direct connection communication process provided by the embodiments of the present application.

Referring to FIG. 2, an embodiment of the present application provides a direct connection communication method, which is performed by a first terminal. The process of the method is described as follows. The direct connection communication method also involves the interaction processes among the second terminal, the network side device (e.g., AMF entity or User Plane Function (UPF) entity), the access network function entity (e.g., Radio Access Network (RAN) entity), etc., so the processes performed by the second terminal, AMF entity or UPF entity, RAN entity side will be described together in the following process description.

S201: the first terminal sends a direct connection communication request message to the second terminal, where the direct connection communication request message carries the QoS parameter of direct connection communication.

In the embodiment of the present application, direct connection communication services, e.g., the transmission of V2X services, are performed between the first terminal and the second terminal, so the first terminal may send the direct connection communication request message to the second terminal to request the establishment of a direct connection communication connection with the second terminal. The V2X services to be transmitted by the first terminal, for example, enhanced V2X services, such as vehicle platooning, advanced driving, extended sensors and remote driving, etc, have the relatively high requirements on delay, reliability, transmission rate, load and other aspects, but the second terminal may not meet these requirements. Therefore, if the direct connection communication performed between the first terminal and the second terminal through broadcasting according to the prior art, the V2X services may not be transmitted between them.

Thus, in the embodiment of the present application, the first terminal may send the direct connection communication request message carrying the QoS parameter of direct connection communication that needs to be satisfied to the second terminal. The second terminal determines the QoS parameter of direct connection communication that the V2X service to be transmitted by the first terminal needs to satisfy according to the received direct connection communication request message, so as to judge whether to perform a direct connection communication connection with the first terminal.

S202: the first terminal receives a direct connection communication response message determined according to the QoS parameter of direct connection communication from the second terminal, wherein the direct connection communication response message is used to indicate that the second terminal accepts or rejects the request from the first terminal.

After the second terminal determines the QoS parameter of direct connection communication that the V2X service to be transmitted by the first terminal needs to satisfy, if the second terminal judges that it cannot meet the requirement of the first terminal for the QoS parameter of direct connection communication, the second terminal will send a direct connection communication response message to the first terminal to inform the first terminal that it cannot meet the requirement on the QoS parameter of direct connection communication and rejects the direct connection communication connection request from the first terminal. In a possible embodiment, the direct connection communication response message carries no QoS parameter of direct connection communication, or the direct connection communication response message carries the identification information indicating that the direct connection communication connection request is rejected.

On the contrary, if the second terminal judges that it can meet the requirement of the first terminal for the QoS parameter of direct connection communication, the second terminal sends a direct connection communication response message to the first terminal to inform the first terminal that it can meet the requirement on the QoS parameter of direct connection communication and accepts the direct connection communication connection request from the first terminal. In a possible embodiment, the direct connection communication response message includes the QoS parameter accepted by the second terminal, where the QoS parameter may be the QoS parameter of direct connection communication carried in the direct connection communication connection request message, or may be other QoS parameter of direct connection communication acceptable to the second terminal.

S203: the first terminal establishes a direct connection communication connection with the second terminal according to the direct connection communication response message if the direct connection communication response message indicates that the second terminal accepts the request from the first terminal.

In the embodiment of the present application, if it is determined that the direct connection communication response message indicates that the second terminal accepts the direct connection communication connection request from the first terminal, the first terminal establishes a direct connection communication connection with the second terminal. In a possible embodiment, the first terminal may establish a direct connection communication connection with the second terminal according to the QoS parameter of direct connection communication carried in the direct connection communication response message, so as to meet the QoS requirement of the direct connection communication service transmitted by the first terminal.

In the of embodiment of the present application, before the first terminal and the second terminal establish a direct connection communication connection, they negotiate the QoS parameter of the direct connection communication service to be transmitted, and the direct connection communication connection is performed only when the second terminal can meet the QoS requirement of the direct connection communication service to be transmitted by the first terminal, so as to meet the QoS requirement of the direct connection communication service well.

Since the direct communication services transmitted by the first terminal are different, the QoS requirements that need to be met may also be different. For example, the enhanced V2X services include four types of typical services: vehicle platooning, advanced driving, extended sensors and remote driving, wherein each type of service corresponds to a different QoS requirement. In another example, the Level of Automation (LoA) is also defined for each type of service, including many levels such as no automation, driver assistance, partial automation, conditional automation, advanced automation, and full automation, etc., where each level of automation corresponds to a different QoS requirement. Therefore, before establishing the direct connection communication connection with the second terminal, the first terminal needs to determine the QoS parameter of direct connection communication according to the direct connection communication service to be transmitted.

Figure 3:
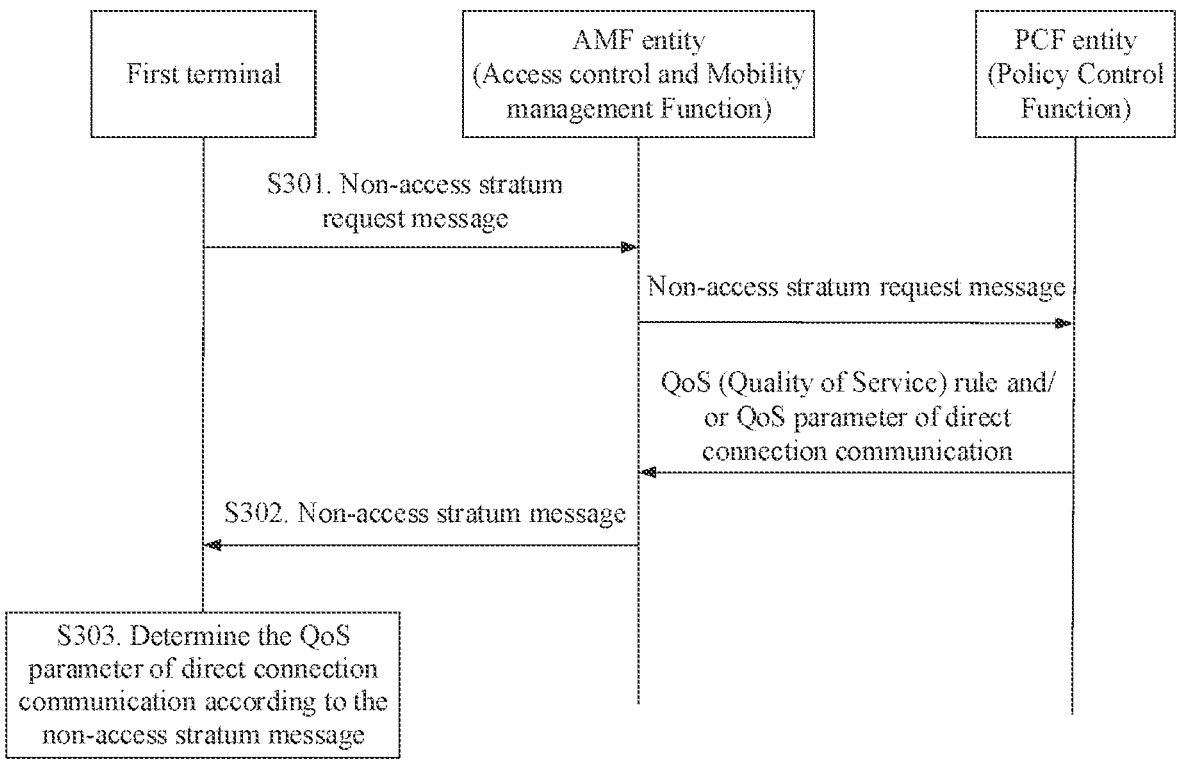
FIG. 3 is a schematic diagram of the process in which a first terminal determines a QoS parameter of direct communication provided by the embodiments of the present application.

Specifically, referring to FIG. 3, in an embodiment of the present application, the first terminal needs to determine the QoS parameter of direct connection before sending the direct connection communication request message to the second terminal.

S301: the first terminal sends a non-access stratum request message to the AMF.

Specifically, the non-access stratum request message carries the information that the first terminal requests the QoS parameter of direct connection communication and/or the information that the first terminal supports the direct connection communication capability. The information requesting the QoS parameter of direct connection communication may be the information of the direct connection communication service to be transmitted by the first terminal, for example, the identification information of the direct connection communication service. The information that the first terminal supports the direct connection communication capability may be considered as the QoS requirement that the first terminal can meet.

S302: the first terminal receives a non-access stratum message sent by the AMF.

In the embodiment of the present application, after receiving the non-access stratum request message sent by the first terminal, the AMF determines that the first terminal requests to determine the QoS parameter of direct connection communication of the direct connection communication service to be transmitted. In a possible embodiment, after receiving the non-access stratum request message sent by the first terminal, the AMF transparently forwards it to a Policy Control Function (PCF) entity. The PCF entity feeds back the QoS rule of direct connection communication and/or a. QoS parameter of direct connection communication to the AMF, and then the AMF feeds back the non-access stratum message to the first terminal, where the non-access stratum message includes the QoS rule of direct connection communication and/or a QoS parameter of direct connection communication. The QoS rule of direct connection communication can be understood as the mapping relationship between communication services and QoS parameters, which may be the mapping relationship between each type of service and QoS parameters, or may be the mapping relationship between each level under each type of service and QoS parameters.

In a possible embodiment, the QoS rule of direct connection communication may include the QoS Flow Identifier (QFI), the priority of the service, and so on. The QoS parameters may include bit rate, transmission rate, transmission delay, etc., which are not listed here.

The AMF may feed back the QoS parameters to the first terminal to inform the QoS parameters of the direct connection communication service corresponding to the first terminal. Alternatively, the AMF may also feed back the QoS rule of direct connection communication to the first terminal, so that the first terminal further determines the QoS parameters of the direct connection communication service to be transmitted according to the QoS rule of direct connection communication. Alternatively, the AMF may feed back the QoS parameters and the QoS rule of direct connection communication directly to the first terminal, and the first terminal determines the QoS parameters of the direct connection communication service to be transmitted.

In a possible embodiment, the AMF may send the QoS parameter and/or the QoS rule of direct connection communication to the first terminal through a Non-Access Stratum (NAS) message.

S303: the first terminal device determines the QoS parameter of direct connection communication according to the non-access stratum message.

In the embodiment of the present application, the first terminal may directly determine the QoS parameter carried in the non-access stratum message as the QoS parameter of the direct connection communication service to be transmitted. Alternatively, the first terminal may determine the QoS parameter of direct connection communication according to the QoS rule of direct connection communication carried in the non-access stratum message and the direct connection communication service to be transmitted by itself Referring to FIG. 4, in an embodiment of the present application, after the direct connection communication connection is established between the first terminal and the second terminal, the determined QoS parameter of direct connection communication can be used to perform the transmission of the direct connection communication service message. During the transmission of the direct connection communication service message, the first terminal requests radio resources from the RAN entity to perform the transmission of the direct connection communication service.

S401: the first terminal sends a radio resource control request message to the RAN entity.

In the embodiment of the present application, the radio resource control request message is used to request radio resources required by the direct connection communication service, wherein the radio resource control request message carries the QoS parameter of direct connection communication.

Specifically, S4011: the first terminal device sends the information requesting the QoS parameter of direct connection communication and/or the information that the first terminal supports the direct connection communication capability to the AMF.

Figure 4:
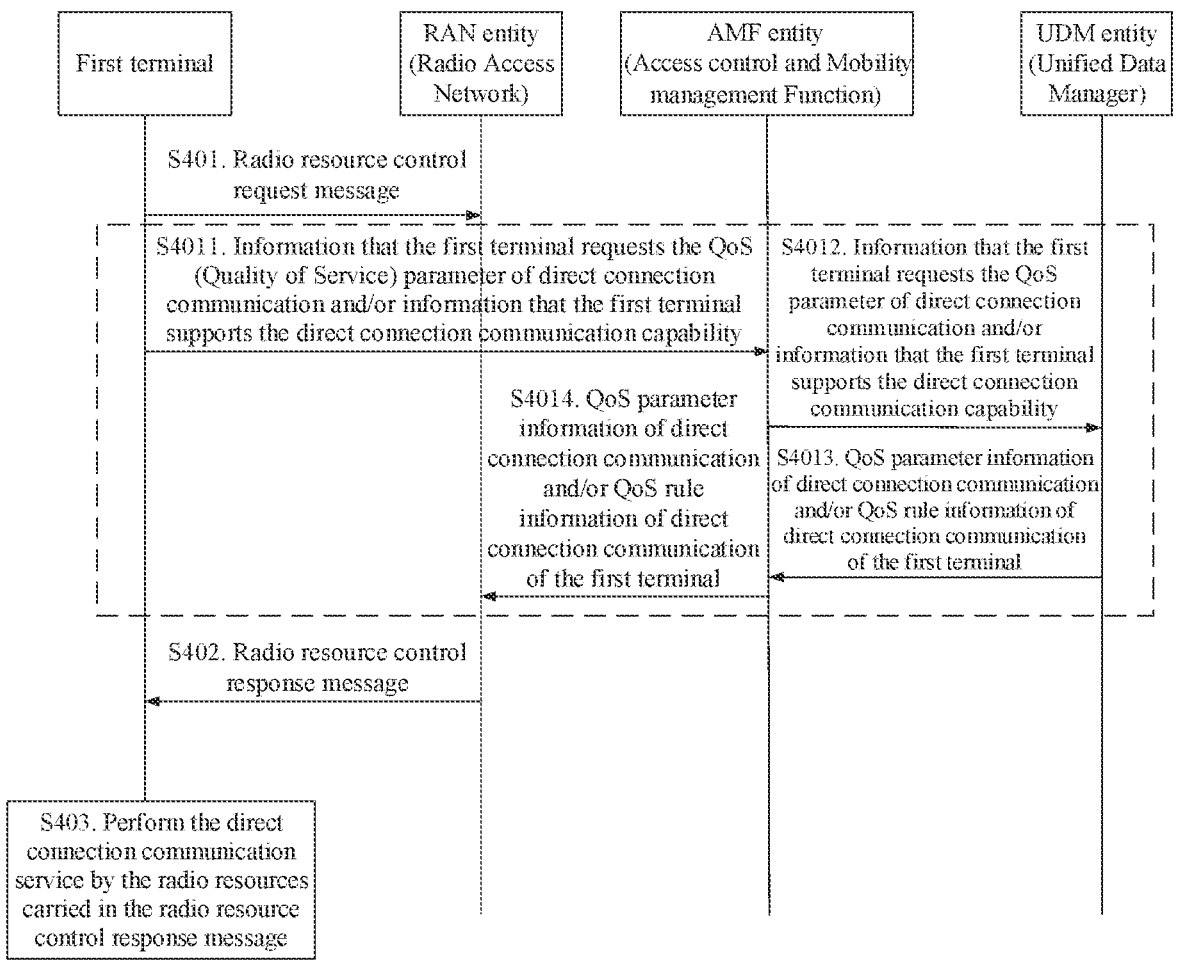
FIG. 4 is a schematic diagram of the process in which the first terminal requests wireless resources from the access network side provided by the embodiments of the present application.

S4012: the AMF entity sends the information that the first terminal requests the QoS parameter of direct connection communication and/or the information that the first terminal supports the direct connection communication capability to the PCF entity or the Unified Data Manager (UDM) entity. FIG. 4 is an example in which the AMF entity sends the information that the first terminal requests the QoS parameter of direct connection communication and/or the information that the first terminal supports the direct connection communication capability to the UDM entity.

S4013: the UDM entity sends the QoS parameter information of direct connection communication and/or the QoS rule information of direct connection communication of the first terminal to the AMF entity.

The UDM entity authorizes and checks the QoS parameter information of direct connection communication requested by the first terminal according to the received. QoS parameter information of direct connection communication and/or QoS rule information of direct connection communication of the first terminal. If the authorization and check pass, the UDM entity feeds back the subscription information of the first terminal to the AMF entity, including the authorization information of the direct connection communication service and the QoS parameters of the direct connection communication service, etc.

S4014: the AMF entity sends the QoS parameter information of direct connection communication and/or the QoS rule information of direct connection communication of the first terminal to the RAN entity.

The RAN entity allocates radio resources for the direct connection communication service of the first terminal according to the received subscription information of the first terminal, so that the first terminal utilizes the allocated radio resources to transmit the direct connection communication service.

S402: the first terminal receives a radio resource control response message returned from the RAN entity, wherein the radio resource control response message includes radio resources determined by the RAN entity according to the QoS parameter of direct connection communication.

S403: the first terminal performs the direct connection communication service by the radio resources carried in the radio resource control response message.

The process after the RAN entity receives the radio resource control request message sent by the first terminal is shown by dashed lines in FIG. 4. It should be noted that the first terminal transfers the QoS parameter of direct connection communication from the non-access stratum to the access stratum after determining the QoS parameter of direct connection communication according to the non-access stratum message.

In summary, in the embodiment of the present application, before the first terminal and the second terminal establish a direct connection communication connection, they negotiate the QoS parameter of the direct connection communication service to be transmitted, and the direct connection communication connection is performed only when the second terminal can meet the QoS requirement of the direct connection communication service to be transmitted by the first terminal, so as to meet the QoS requirement of the direct connection communication service well.

In the embodiment of the present application, the network side provides the QoS rule of direct connection communication and/or a QoS parameters for the first terminal, so that the first terminal determines the final QoS parameter according to its actual QoS requirement, so as to meet its actual QoS requirement well when performing the direct connection communication service with the second terminal.

In the embodiment of the present application, the access network side allocates radio resources to the first terminal according to the actual QoS requirement of the first terminal itself, so that the first terminal can meet its actual QoS requirement well when using the radio resources allocated by the access network side to perform the direct connection communication service.

The devices provided by the embodiments of the present application will be introduced below with reference to the accompanying drawings.

Figure 5:
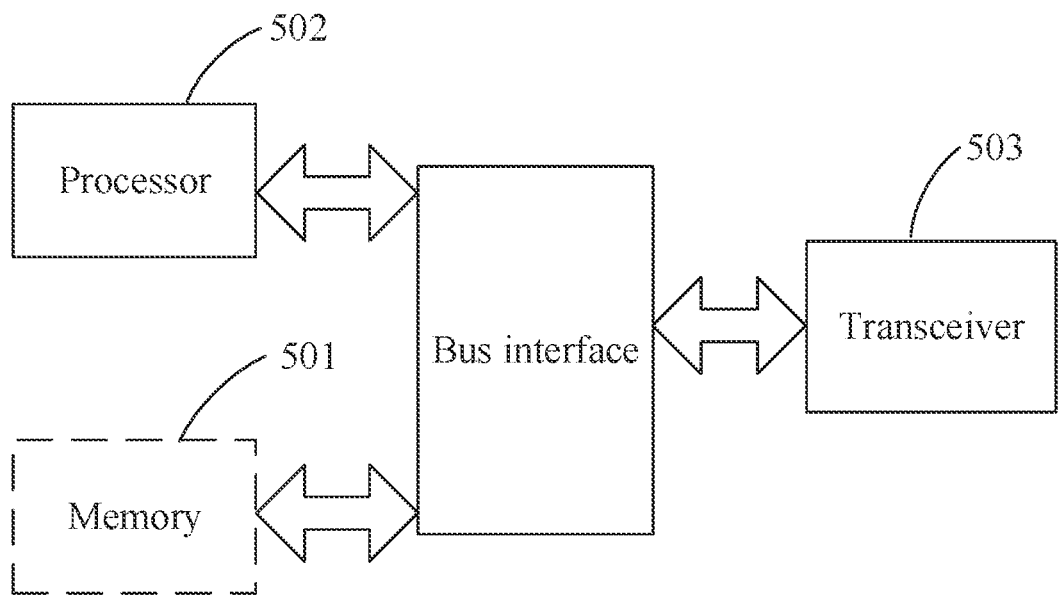
FIG. 5 is a structural schematic diagram of the first terminal provided by the embodiments of the present application.

Referring to FIG. 5, based on the same inventive concept, an embodiment of the present application provides a terminal. The terminal may be a mobile phone or a vehicle, etc. The terminal may include: a memory 501, a processor 502, and a transceiver 503, wherein the memory 501 and the transceiver 503 may be connected to the processor 502 through a bus interface (taking this as an example in FIG. 5), or may be connected to the processor 502 through special connection lines.

Here, the memory 501 may be configured to store programs. The transceiver 503 is configured to receive and send data under the control of the processor. The processor 502 may be configured to read the programs in the memory 501 to:

send a direct connection communication request message to a second terminal via the transceiver 503, wherein the direct connection communication request message carries a QoS parameter of direct connection communication;

receive a direct connection communication response message determined according to the QoS parameter of direct connection communication from the second terminal via the transceiver 503, wherein the direct connection communication response message is used to indicate that the second terminal accepts or rejects a request from the first terminal; and establish a direct connection communication connection with the second terminal according to the direct connection communication response message if the direct connection communication response message indicates that the second terminal accepts the request from the first terminal.

Optionally, if the direct connection communication response message indicates that the second terminal accepts the request from the first terminal, the direct connection communication response message includes QoS parameters accepted by the second terminal.

Optionally, the processor 502 is further configured to:

receive a non-access stratum message sent from an Access and Mobility management Function (AMF) entity via the transceiver 503, wherein the non-access stratum message includes a QoS rule of direct connection communication and/or a QoS parameter of direct connection communication; and determine the QoS parameter of direct connection communication according to the non-access stratum message.

Optionally, the processor 502 is further configured to:

send a non-access stratum request message to the AMF via the transceiver 503, wherein the non-access stratum request message includes the information that the first terminal requests the QoS parameter of direct connection communication and/or the information that the first terminal supports a direct connection communication capability.

Optionally, the processor 502 is further configured to:

send a radio resource control request message to an access network function entity via the transceiver 503, wherein the radio resource control request message is used to request radio resources required by a direct connection communication service, and the radio resource control request message carries the QoS parameter of direct connection communication;

receive a radio resource control response message returned from the access network function entity via the transceiver 503, wherein the radio resource control response message includes radio resources determined by the access network function entity according to the QoS parameter of direct connection communication; and perform the direct connection communication service by the radio resources carried in the radio resource control response message.

Optionally, the processor 502 is further configured to:

determine the QoS parameter of direct connection communication according to the QoS rule of direct connection communication carried in the non-access stratum message; and transfer the QoS parameter of direct connection communication from the non-access stratum to the access stratum.

Here, in FIG. 5, the bus architecture may include any numbers of interconnected buses and bridges, and specifically link various circuits of one or more processors represented by the processor 502 and the memory represented by the memory 501. The bus architecture may further link various other circuits such as peripheral device, voltage regulator and power management circuit, which are all well known in the art and thus will not be further described again herein. The bus interface provides an interface. The transceiver 503 may be a plurality of elements, i.e., include a transmitter and a receiver, and provide the units for communicating with various other devices over the transmission media. The processor 502 is responsible for managing the bus architecture and general processing, and the memory 501 may store the data used by the processor 502 when performing the operations.

Optionally, the memory 501 may include a Read Only Memory (ROM), a Random Access Memory (RAM), and a magnetic disk memory. The memory 501 is used to store the data required by the processor 502 when the processor is running, that is, store the instructions that can be executed by at least one processor 502. The at least one processor 502 performs the direct connection communication method provided by the embodiments shown in FIGS. 2-4 by executing the instructions stored in the memory 501. Here, the number of memories 501. is one or more. Here, the memory 501 is shown together in FIG. 5, but it should be known that the memory 501 is not a mandatory functional module, so it is shown by broken lines in FIG. 5.

Figure 6:
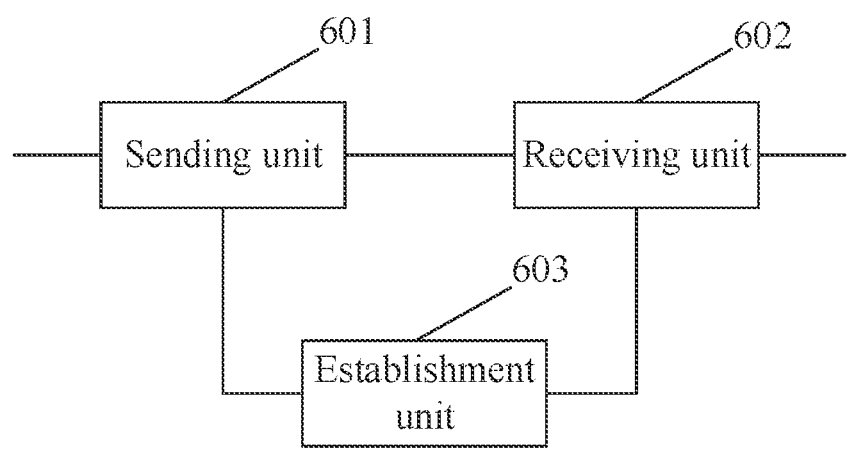
FIG. 6 is another structural schematic diagram of the first terminal provided by the embodiments of the present application.

Referring to FIG. 6, based on the same inventive concept, an embodiment of the present application provides a terminal. The terminal may be a mobile phone or a vehicle, etc. The terminal is the first terminal described above and may include: a sending unit 601, a receiving unit 602 and an establishment unit 603. Here, the sending unit 601 is configured to send a direct connection communication request message to a second terminal, wherein the direct connection communication request message carries a QoS parameter of direct connection. communication. The receiving unit 602 is configured to receive a direct connection communication response message determined according to the QoS parameter of direct connection communication from the second terminal, wherein the direct connection communication response message is used to indicate that the second terminal accepts or rejects the request from the first terminal. The establishing unit 603 is configured to establish a direct connection communication connection with the second terminal according to the direct connection communication response message if the direct connection communication response message indicates that the second terminal accepts the request from the first terminal.

Optionally, if the direct connection communication response message indicates that the second terminal accepts the request from the first terminal, the direct connection communication response message includes QoS parameters accepted by the second terminal.

Optionally, the receiving unit 602 is further configured to:

receive a non-access stratum message sent from an AMF entity, wherein the non-access stratum message includes a QoS rule of direct connection communication and/or a QoS parameter of direct connection communication; and determine the QoS parameter of direct connection communication according to the non-access stratum message.

Optionally, the sending unit 601 is further configured to:

send a non-access stratum request message to the AMF, wherein the non-access stratum request message includes the information that the first terminal requests the QoS parameter of direct connection communication and/or the information that the first terminal supports a direct connection communication capability.

Optionally, the sending unit 601 is further configured to: send a radio resource control request message to an access network function entity, wherein the radio resource control request message is used to request radio resources required by a direct connection communication service, and the radio resource control request message carries the QoS parameter of direct connection communication.

The receiving unit 602 is further configured to: receive a radio resource control response message returned from the access network function entity, wherein the radio resource control response message includes radio resources determined by the access network function entity according to the QoS parameter of direct connection communication.

The establishing unit 603 is further configured to: perform the direct connection communication service by the radio resources carried in the radio resource control response message.

Optionally, the establishing unit 603 is specifically configured to:

determine the QoS parameter of direct connection communication according to the QoS rule of direct connection communication carried in the non-access stratum message; and transfer the QoS parameter of direct connection communication from the non-access stratum to the access stratum.

Here, the physical devices corresponding to the sending unit 601, the receiving unit 602 and the establishing unit 603 may all be the aforementioned processor 502 or transceiver 503. This terminal can be used to perform the methods provided by the embodiments shown in FIGS. 2-4. Therefore, for the functions that can be implemented by the functional modules in the device, the reference may be made to the corresponding description in the embodiments shown in FIGS. 2-4, which will not be repeated.

Figure 7:
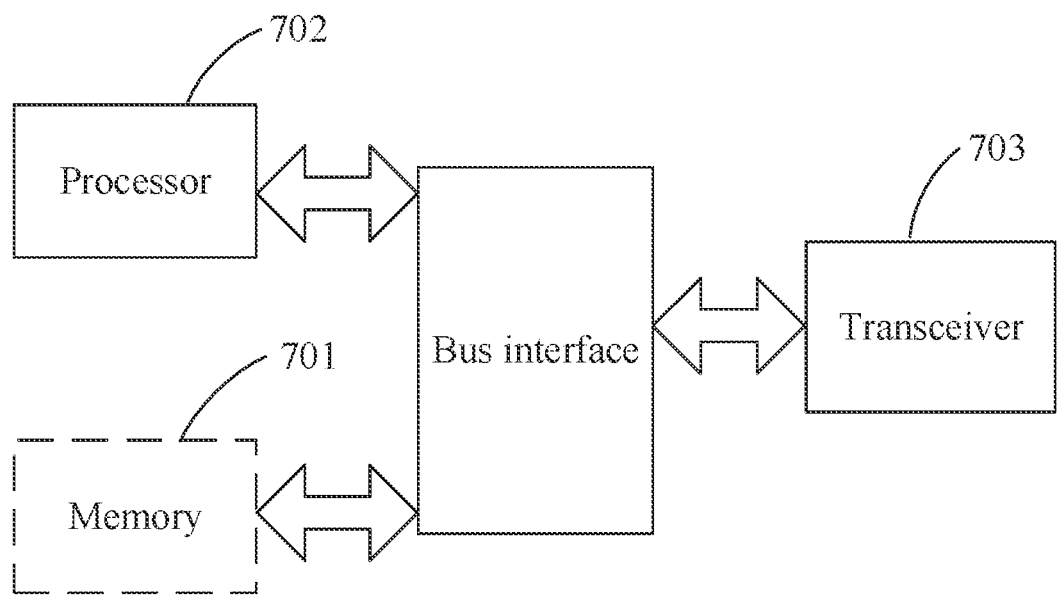
FIG. 7 is a structural schematic diagram of an AMF entity provided by the embodiments of the present application.

Referring to FIG. 7, based on the same inventive concept, an embodiment of the present application provides an AMF entity, which may include: a memory 701, a processor 702, and a transceiver 703, wherein the memory 701 and the transceiver 703 may be connected to the processor 702 through a bus interface (taking this as an example in FIG. 7), or may be connected to the processor 702 through special connection lines.

Here, the memory 701 may be configured to store programs. The transceiver 703 is configured to receive and send data under the control of the processor 702. The processor 702 may be configured to read the programs in the memory 701 to:

receive a non-access stratum request message sent by a first terminal via the transceiver 703, wherein the non-access stratum request message includes information that the first terminal requests a QoS parameter of direct connection communication and/or information that the first terminal supports a direct connection communication capability; and send a non-access stratum message to the first terminal via the transceiver, wherein the non-access stratum message includes a QoS rule of direct connection communication and/or a QoS parameter of direct connection communication.

Optionally, the processor 702 is further configured to:
send an application message to an access network function entity via the transceiver 703, wherein the application message includes the QoS parameter of direct connection communication of the first terminal.

Optionally, the processor 702 is further configured to:
send the information that the first terminal requests the QoS parameter of direct connection communication and/or information that the first terminal supports the direct connection communication capability to a policy control function entity and/or unified data management function entity via the transceiver 703.

Optionally, the processor 702 is further configured to:
receive the QoS parameter information of direct connection communication and/ or the QoS rule information of direct connection communication of the first terminal from the policy control function entity and/or unified data management function entity via the transceiver 703.

Here, in FIG. 7, the bus architecture may include any numbers of interconnected buses and bridges, and specifically link various circuits of one or more processors represented by the processor 702 and the memory represented by the memory 701. The bus architecture may further link various other circuits such as peripheral device, voltage regulator and power management circuit, which are all well known in the art and thus will not be further described again herein. The bus interface provides an interface. The transceiver 703 may be a plurality of elements, i.e., include a transmitter and a receiver, and provide the units for communicating with various other devices over the transmission media. The processor 702 is responsible for managing the bus architecture and general processing, and the memory 701 max store the data used by the processor 702 when performing the operations.

Optionally, the memory 701 may include a Read Only Memory (ROM), a Random Access Memory (RAM), and a magnetic disk memory. The memory 701 is used to store the data required by the processor 702 when running, that is, store the instructions that can be executed by at least one processor 702. The at least one processor 702 performs the direct connection communication method provided by the embodiments shown in FIGS. 2-4 by executing the instructions stored in the memory 701. Here, the number of memories 701 is one or more. Here, the memory 701 is shown together in FIG. 7, but it should be known that the memory 701 is not a mandatory functional module, so it is shown by broken lines in FIG. 7.

Figure 8:
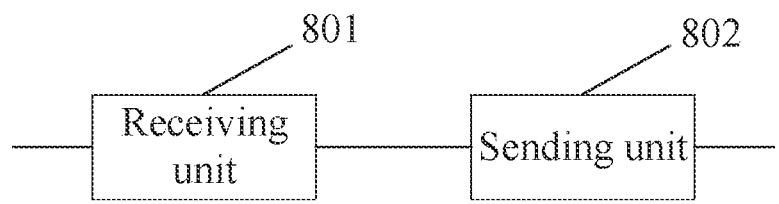
FIG. 8 is another structural schematic diagram of an AMF entity provided by an embodiment of the present application.

Referring to FIG. 8, based on the same inventive concept, an embodiment of the present application provides an AMF entity, which may include a receiving unit 801 and a sending unit 802. Here, the receiving unit 801 is configured to receive a non-access stratum request message sent by a first terminal, wherein the non-access stratum request message includes the information that the first terminal requests a QoS parameter of direct connection communication and/or the information that the first terminal supports a direct connection communication capability. The sending unit 802 is configured to send a non-access stratum message to the first terminal, wherein the non-access stratum message includes a QoS rule of direct connection communication and/or a QoS parameter of direct connection communication.

Optionally, the sending unit 802 is further configured to:
send an application message to an access network function entity, wherein the application message includes the QoS parameter of direct connection communication of the first terminal.

Optionally, the sending unit 802 is further configured to:
send the information that the first terminal requests the QoS parameter of direct connection communication and/or information that the first terminal supports the direct connection communication capability to a policy control function entity and/or unified data management function entity.

Optionally, the receiving unit 801 is further configured to:
receive the QoS parameter information of direct connection communication and/or the QoS rule information of direct connection communication of the first terminal from the policy control function entity and/or unified data management function entity.

Here, the physical devices corresponding to the receiving unit 801 and the sending unit 802 may all be the aforementioned processor 702 or transceiver 703. This AMF entity can be used to perform the methods provided by the embodiments shown in FIGS. 2-4. Therefore, for the functions that can be implemented by the functional modules in the device, the reference may be made to the corresponding description in the embodiments shown in FIGS. 2-4, which will not be repeated.

Figure 9:
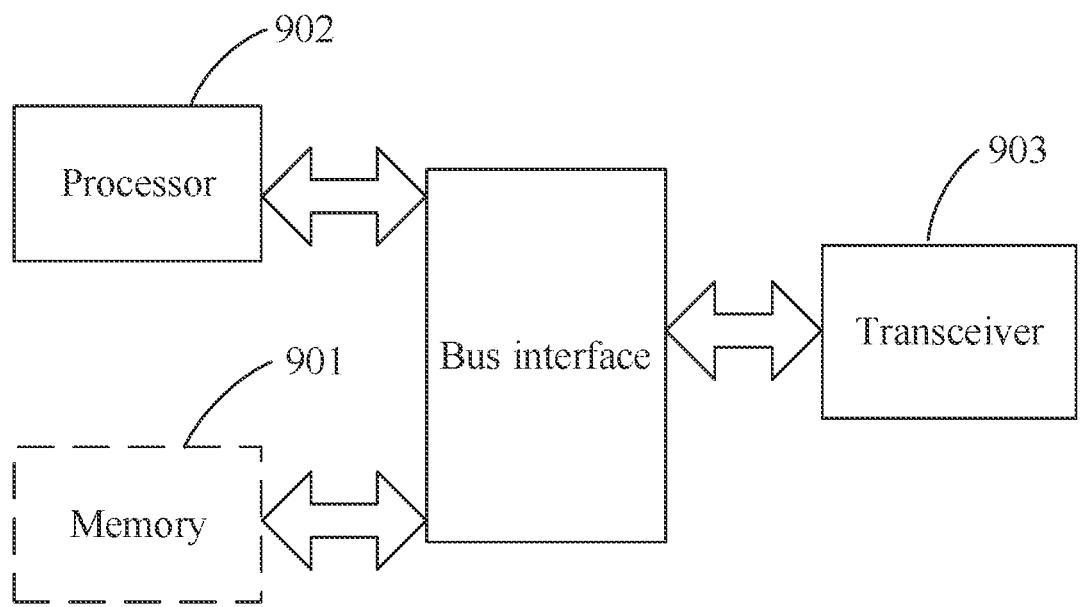
FIG. 9 is a structural schematic diagram of an access network functional entity provided by an embodiment of the present application.

Referring to FIG. 9, based on the same inventive concept, an embodiment of the present application provides an access network function entity, which may include: a memory 901, a processor 902, and a transceiver 903, wherein the memory 901 and the transceiver 903 may be connected to the processor 902 through a bus interface (taking this as an example in FIG. 9), or may be connected to the processor 902 through special connection lines.

Here, the memory 901 may be configured to store programs. The transceiver 903 is configured to receive and send data under the control of the processor 902. The processor 902 may be configured to read the programs in the memory 901 to:

receive a radio resource control request message sent by a first terminal via the transceiver 903, wherein the radio resource control request message includes the QoS parameter information of direct connection communication; and send a radio resource control response message to the first terminal via the transceiver 903, wherein the radio resource control response message includes radio resource information required by a direct communication service.

Optionally, the processor 902 is further configured to:
receive a QoS parameter of direct connection communication of the first terminal from an AMF entity via the transceiver 903; and determine radio resources required by the first terminal to perform the direct communication service according to the QoS parameter of direct connection communication of the first terminal.

Here, in FIG. 9, the bus architecture may include any numbers of interconnected buses and bridges, and specifically link various circuits of one or more processors represented by the processor 902 and the memory represented by the memory 901 The bus architecture may further link various other circuits such as peripheral device, voltage regulator and power management circuit, which are all well known in the art and thus will not be further described again herein. The bus interface provides an interface. The transceiver 903 may be a plurality of elements, i.e., include a transmitter and a receiver, and provide the units for communicating with various other devices over the transmission media. The processor 902 is responsible for managing the bus architecture and general processing, and the memory 901 may store the data used by the processor 902 when performing the operations.

Optionally, the memory 901 may include a Read Only Memory (ROM), a Random Access Memory (RAM), and a magnetic disk memory. The memory 901 is used to store the data required by the processor 902 when running, that is, store the instructions that can be executed by at least one processor 902. The at least one processor 902 performs the direct connection communication method provided by the embodiments shown in FIGS. 2-4 by executing the instructions stored in the memory 901. Here, the number of memories 901 is one or more. Here, the memory 901 is shown together in FIG. 9, but it should be known that the memory 901 is not a mandatory functional module, so it is shown by broken lines in FIG. 9.

Figure 10:
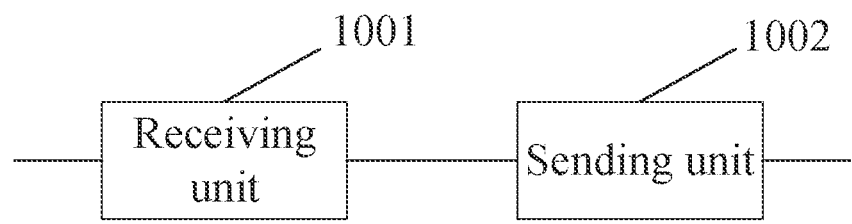
FIG. 10 is another structural schematic diagram of an access network functional entity provided by an embodiment of the present application.

Referring to FIG. 10, based on the same inventive concept, an embodiment of the present application provides an access network function entity, which may include: a receiving unit 1001 and a sending unit 1002. Here, the receiving unit 1001 is configured to receive a radio resource control request message sent by a first terminal, wherein the radio resource control request message includes the QoS parameter information of direct connection communication. The sending unit 1002 is configured to send a radio resource control response message to the first terminal, wherein the radio resource control response message includes the radio resource information required by a direct communication service.

Optionally, the receiving unit 1001 is further configured to:
receive a QoS parameter of direct connection communication of the first terminal from an AMP entity; and
determine radio resources required by the first terminal to perform the direct communication service according to the QoS parameter of direct connection communication of the first terminal.

Here, the physical devices corresponding to the receiving unit 1001 and the sending unit 1002 may all be the aforementioned processor 902 or transceiver 903. This access network function entity can be used to perform the methods provided by the embodiments shown in FIGS. 2-4. Therefore, for the functions that can be implemented by the functional modules in the device, the reference may be made to the corresponding description in the embodiments shown in FIGS. 2-4, which will not be repeated.

Based on the same inventive concept, an embodiment of the present invention further provides a computer storage medium, wherein the computer storage medium stores computer instructions. When the computer instructions run on a computer, the direct connection communication method provided by the embodiments shown in FIGS. 2-4 is performed.

In some possible embodiments, various aspects of the direct connection communication method, AMF entity and PCF entity, UDM entity and RAN entity provided by the present application can also be implemented in the form of a program product, which includes program codes. When the program product runs on a computer device, the program codes are configured to cause the computer device to perform the steps in the direct connection communication method according to various exemplary embodiments of the present application described above in this specification, for example, the computer device may perform the direct connection communication method provided by the embodiments as shown in FIGS. 2-4.

The program product can use any combination of one or more readable media. The readable medium may be a readable signal medium or a readable storage medium. The readable storage medium may be, for example but not limited to, electrical, magnetic, optical, electromagnetic, infrared, or semiconductor system, apparatus or device, or any combination thereof. More specific examples of the readable storage media (non-exhaustive list) include: electrical connection with one or more wires, portable disk, hard disk. Random Access Memory (RAM), Read Only Memory (ROM), Erasable Programmable Read Only Memory (EPROM) or flash memory, optical fiber, portable Compact Disk-Read Only Memory (CD-ROM), optical storage device, magnetic storage device, or any suitable combination thereof.

The program product for the AMF selection method of the embodiment of the present application may adopt a portable Compact Disk-Read Only Memory (CD-ROM) and include program codes, and may be run on a computing device. However, the program product of the present application is not limited to this. In this document, the readable storage medium can be any tangible medium that contains or stores a program, where the program can be used by or used in combination with the instruction execution system, apparatus or device.

The readable signal medium may include data signals propagated in the baseband or as a part of carrier waves, and the readable program codes are beared therein. Such propagated data signals can be in many forms, including but not limited to electromagnetic signals, optical signals, or any suitable combination thereof. The readable signal medium may also be any readable medium other than the readable storage medium, and the readable medium may send, propagate or transmit the programs used by or used in combination with the instruction execution system, apparatus or device.

The program codes contained on the readable medium can be transmitted by any suitable medium, including but not limited to wireless, wired, optical cable, RF, etc., or any suitable combination thereof.

The program codes for performing the operations of the present application can be compiled in any combination of one or more programming languages, where the programming languages include the object-oriented programming languages such as Java, C++, etc., and also include the conventional procedural programming languages such as "C" language or similar programming languages. The program codes can be executed entirely on a user computing device, executed partly on a user computing device, executed as an independent software package, executed partly on a user computing device and partly on a remote computing device, or executed entirely on a remote computing device or server. In the case of a remote computing device, the remote computing device can be connected to the user computing device through any kind of network including Local Area Network (LAN) or Wide Area Network (WAN), or can be connected to an external computing device (for example, using the Internet service provider to connect via the Internet).

It should be noted that several units or subunits of the apparatuses are mentioned in the above detailed description, but such division is only exemplary and not mandatory. In fact, according to the embodiments of the present application, the features and functions of two or more units described above may be embodied in one unit. Conversely, the features and functions of one unit described above may be further divided into multiple units to be embodied.

In addition, although the operations of the method of the present application are described in a specific order in the drawings, this does not require or imply that these operations must be performed in the specific order or that all the operations shown must be performed to achieve the desired result. Additionally or alternatively, some steps may be omitted, multiple steps may be combined into one step for execution, and/or one step may be decomposed into multiple steps for execution.

It should be understood by those skilled in the art that the embodiments of the present application can provide methods, systems and computer program products. Thus the present application can take the form of hardware embodiments alone, software embodiments alone, or embodiments combining the software and hardware aspects, Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A direct connection communication method, comprising:

sending, by a first terminal, a direct connection communication request message to a second terminal, wherein the direct connection communication request message carries a Quality of Service (QoS) parameter of direct connection communication;

receiving, by the first terminal, a direct connection communication response message determined according to the QoS parameter of direct connection communication from the second terminal, wherein the direct connection communication response message is used to indicate that the second terminal accepts or rejects a request from the first terminal; and establishing, by the first terminal, a direct connection communication connection with the second terminal according to the direct connection communication response message if the direct connection communication response message indicates that the second terminal accepts the request from the first terminal;

wherein before the first terminal sends the direct connection communication request message to the second terminal, the method further comprises:

receiving, by the first terminal, a non-access stratum message sent from an Access control and Mobility management Function (AMF) entity, wherein the non-access stratum message comprises a QoS rule of direct connection communication and/or a QoS parameter of direct connection communication; and determining, by the first terminal, the QoS parameter of direct connection communication according to the non-access stratum message;

wherein determining, by the first terminal, the QoS parameter of direct connection communication according to the non-access stratum message, comprises:

determining, by the first terminal, the QoS parameter of direct connection communication according to the QoS rule of direct connection communication carried in the non-access stratum message; and transferring, by the first terminal, the QoS parameter of direct connection communication from non-access stratum to access stratum.

2. The method of claim 1, wherein if the direct connection communication response message indicates that the second terminal accepts the request from the first terminal, the direct connection communication response message comprises QoS parameters accepted by the second terminal.

3. The method of claim 1, wherein before the first terminal receives the non-access stratum message sent from the AMF entity, the method further comprises:

sending, by the first terminal, a non-access stratum request message to the AMF entity, wherein the non-access stratum request message comprises information that the first terminal requests the QoS parameter of direct connection communication and/or information that the first terminal supports a direct connection communication capability.

4. The method of claim 1, wherein after the first terminal establishes the direct connection communication connection with the second terminal according to the direct connection communication response message, the method further comprises:

sending, by the first terminal, a radio resource control request message to an access network function entity, wherein the radio resource control request message is used to request radio resources required by a direct connection communication service, and the radio resource control request message carries the QoS parameter of direct connection communication;

receiving, by the first terminal, a radio resource control response message returned from the access network function entity, wherein the radio resource control response message comprises radio resources determined by the access network function entity according to the QoS parameter of direct connection communication; and performing, by the first terminal, the direct connection communication service by the radio resources carried in the radio resource control response message.

5. A terminal, comprising:
a memory configured to store instructions;
a processor configured to read the instructions in the memory to perform the method of claim 1;
wherein the transceiver is configured to receive and send data under control of the processor.

6. The terminal of claim 5, wherein if the direct connection communication response message indicates that the second terminal accepts the request from the first terminal, the direct connection communication response message comprises QoS parameters accepted by the second terminal.

7. The terminal of claim 5, wherein the processor is further configured to:

send a non-access stratum request message to the AMF entity via the transceiver, wherein the non-access stratum request message comprises information that the first terminal requests the QoS parameter of direct connection communication and/or information that the first terminal supports a direct connection communication capability.

8. The terminal of claim 5, wherein the processor is further configured to:

send a radio resource control request message to an access network function entity via the transceiver, wherein the radio resource control request message is used to request radio resources required by a direct connection communication service, and the radio resource control request message carries the QoS parameter of direct connection communication;

receive a radio resource control response message returned from the access network function entity via the transceiver, wherein the radio resource control response message comprises radio resources determined by the access network function entity according to the QoS parameter of direct connection communication; and perform the direct connection communication service by the radio resources carried in the radio resource control response message.

9. A direct connection communication method, comprising:

receiving, by an Access control and Mobility management Function (AMF) entity, a non-access stratum request message sent by a first terminal, wherein the non-access stratum request message comprises information that the first terminal requests a Quality of Service (QoS) parameter of direct connection communication and/or information that the first terminal supports a direct connection communication capability; and sending, by the AMF entity, a non-access stratum message to the first terminal, wherein the non-access stratum message comprises a QoS rule of direct connection communication and/or a QoS parameter of direct connection communication.

10. The method of claim 9, wherein after the AMF entity sends the non-access stratum message to the first terminal, the method further comprises:

sending, by the AMF entity, an application message to an access network function entity, wherein the application message comprises the QoS parameter of direct connection communication of the first terminal.

11. The method of claim 9, wherein after the AMF entity receives the non-access stratum request message sent by the first terminal, the method further comprises:

sending, by the AMF entity, the information that the first terminal requests the QoS parameter of direct connection communication and/or information that the first terminal supports the direct connection communication capability to a policy control function entity and/or unified data management function entity;

wherein before the AMF entity sends the non-access stratum message to the first terminal or sends the application message to the access network function entity, the method further comprises:

receiving, by the AMF entity, QoS parameter information of direct connection communication and/or QoS rule information of direct connection communication of the first terminal from the policy control function entity and/or unified data management function entity.

12. An Access control and Mobility management Function (AMF) entity, comprising:
a memory configured to store instructions;
a processor configured to read the instructions in the memory to perform the method of claim 9;
wherein the transceiver is configured to receive and send data under control of the processor.

13. The AMF entity of claim 12, wherein the processor is further configured to:

send an application message to an access network function entity via the transceiver, wherein the application message comprises the QoS parameter of direct connection communication of the first terminal.

14. The AMF entity of claim 12, wherein the processor is further configured to:

send the information that the first terminal requests the QoS parameter of direct connection communication and/or information that the first terminal supports the direct connection communication capability to a policy control function entity and/or unified data management function entity via the transceiver;

wherein the processor is further configured to:
receive QoS parameter information of direct connection communication and/or QoS rule information of direct connection communication of the first terminal from the policy control function entity and/or unified data management function entity via the transceiver.

15. A direct connection communication method, comprising:
receiving, by an access network function entity, a radio resource control request message sent by a first terminal, wherein the radio resource control request message comprises Quality of Service (QoS) parameter information of direct connection communication; and
sending, by the access network function entity, a radio resource control response message to the first terminal, wherein the radio resource control response message comprises radio resource information required by a direct communication service.

16. The method of claim 15, wherein before the access network function entity receives the radio resource control request message sent by the first terminal, the method further comprises:
receiving, by the access network function entity, a QoS parameter of direct connection communication of the first terminal from an Access control and Mobility management Function (AMF) entity; and
determining, by the access network function entity, radio resources required by the first terminal to perform the direct communication service according to the QoS parameter of direct connection communication of the first terminal.

17. An access network function entity, comprising:
a memory configured to store instructions;
a processor configured to read the instructions in the memory to perform the method of claim 15;
wherein the transceiver is configured to receive and send data under control of the processor.

18. The access network function entity of claim 17, wherein the processor is further configured to:
receive a QoS parameter of direct connection communication of the first terminal from an Access control and Mobility management Function (AMF) entity via the transceiver; and
determine radio resources required by the first terminal to perform the direct communication service according to the QoS parameter of direct connection communication of the first terminal.

* * * * *